United States Patent
Hu et al.

(10) Patent No.: US 11,734,510 B2
(45) Date of Patent: Aug. 22, 2023

(54) NATURAL LANGUAGE PROCESSING OF ENCODED QUESTION TOKENS AND ENCODED TABLE SCHEMA BASED ON SIMILARITY

(71) Applicant: Bayerische Motoren Werke Aktiengesellschaft, Munich (DE)

(72) Inventors: Wangsu Hu, Chicago, IL (US); Jilei Tian, Chicago, IL (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 208 days.

(21) Appl. No.: 17/004,051

(22) Filed: Aug. 27, 2020

(65) Prior Publication Data

US 2022/0067281 A1    Mar. 3, 2022

(51) Int. Cl.
*G06F 40/226*     (2020.01)
*G06F 40/284*     (2020.01)
*G06F 40/30*      (2020.01)

(52) U.S. Cl.
CPC ............ *G06F 40/284* (2020.01); *G06F 40/30* (2020.01)

(58) Field of Classification Search
CPC ...... G06F 40/20; G06F 40/226; G06F 40/237; G06F 40/247; G06F 40/268; G06F 40/284; G06F 40/30; G06F 16/13; G06F 16/22; G06F 16/2423; G06F 16/24524
USPC ................... 704/1, 9, 10; 707/749, 755, 756
See application file for complete search history.

(56) References Cited

U.S. PATENT DOCUMENTS

| | | | | |
|---|---|---|---|---|
| 7,120,574 B2* | 10/2006 | Troyanova | ............ | G06F 40/242 704/10 |
| 7,865,480 B2* | 1/2011 | Bussler | ................ | G06F 9/4492 707/703 |
| 8,280,919 B2* | 10/2012 | Krishnaswamy | ... | G06F 9/44589 707/803 |
| 8,443,005 B1* | 5/2013 | Goldman | ............ | G06F 16/9024 707/798 |
| 10,503,571 B2* | 12/2019 | Parks | ...................... | G06F 9/546 |
| 10,769,374 B1* | 9/2020 | Chen | ....................... | G06F 40/30 |
| 10,776,579 B2* | 9/2020 | Mishra | ................... | G06F 40/30 |
| 11,238,084 B1* | 2/2022 | Newman | ................. | G06F 16/284 |
| 2015/0339574 A1* | 11/2015 | Allen | ...................... | G06F 40/30 706/11 |

(Continued)

*Primary Examiner* — Martin Lerner
(74) *Attorney, Agent, or Firm* — 2SPL Patent Attorneys PartG mb; Kieran O'Leary (57) ABSTRACT

Embodiments relate to a method, a computer program and a system for optimizing execution of natural language to structured query language. The method comprises the steps of—receiving a natural language text input and performing natural language processing on the natural language text input to generate a plurality of encoded question tokens. Next, the method comprises performing natural language processing on a plurality of table schema stored in a database to generate a plurality of encoded table schema tokens for each table schema. Further, the method comprises determining a similarity between the plurality of encoded question tokens and the plurality of encoded table schema tokens for at least two table schemas of the plurality of table schema. Furthermore, the method comprises determining an output table schema from the plurality of table schema based on the similarity and outputting a natural language string based on the output table schema.

11 Claims, 4 Drawing Sheets

(56) References Cited

U.S. PATENT DOCUMENTS

| | | | |
|---|---|---|---|
| 2017/0300558 A1* | 10/2017 | Damodaran | G06F 16/2423 |
| 2018/0373782 A1* | 12/2018 | Liu | G06F 40/30 |
| 2019/0188198 A1* | 6/2019 | Okajima | G06F 16/2423 |
| 2020/0167427 A1* | 5/2020 | Filoti | G10L 15/22 |
| 2021/0149994 A1* | 5/2021 | Kim | G06F 40/284 |
| 2021/0165800 A1* | 6/2021 | Kim | G06F 40/30 |
| 2021/0240776 A1* | 8/2021 | Jawagal | G06F 40/284 |
| 2021/0397595 A1* | 12/2021 | Roitman | G06F 16/2423 |

* cited by examiner

NATURAL LANGUAGE PROCESSING OF ENCODED QUESTION TOKENS AND ENCODED TABLE SCHEMA BASED ON SIMILARITY

FIELD

Embodiments relate to a method, a computer program and a system for optimizing execution of natural language to structured query language.

BACKGROUND

One of major tasks in modern natural voice or textual user interaction (e. g. natural language Interfaces, NLI) is the generation of an output information in natural language based on an information stored in a database for an inputted natural language string. NLI is a research area at the intersection of Natural Language Understanding (NLU) and human-computer interactions (HCI), seek to provide means for human to interact with computer with the use of natural language. Natural Language to SQL (NL2SQL) problem is under such research area to translate natural language question to structural and executable SQL query, and response users answer. For this purpose, the natural language string is converted into structured query language, compared with a database and an output natural language string is generated based on the information of the database. It may be desired to have a low complexity constraint and/or a high performance for outputting a natural language string based on an information stored in a database. To benchmark NL2SQL performance, WikiSQL that was first introduced in 2017 by Saleforces then becomes one of the most popular benchmark dataset for NLI evaluation later can be used. WikiSQL contains a corpus of 80 k hand-crafted instances of natural language questions, SQL queries, and SQL tables extracted from over 25 k HTML tables from Wikipedia. The objective may be, given one natural language question, to generate the correct SQL query.

SUMMARY

A database stores a vast of information then provides the foundation of applications in various areas. In the past, access to this data required either by rigid application programming interfaces (APIs), or professionals who are able to query the data. With the rapid growth of mobile devices such as smartphone and tablet, more and more mobile data has been stored in local disk and cloud service. Not only the business owners but also users are eager to flexibly leverage the data to maximize the value of data. However, accessing such relational databases require an understanding of structural query language such as SQL, while powerful human-computer interaction, is difficult to master in general.

Figure 4:
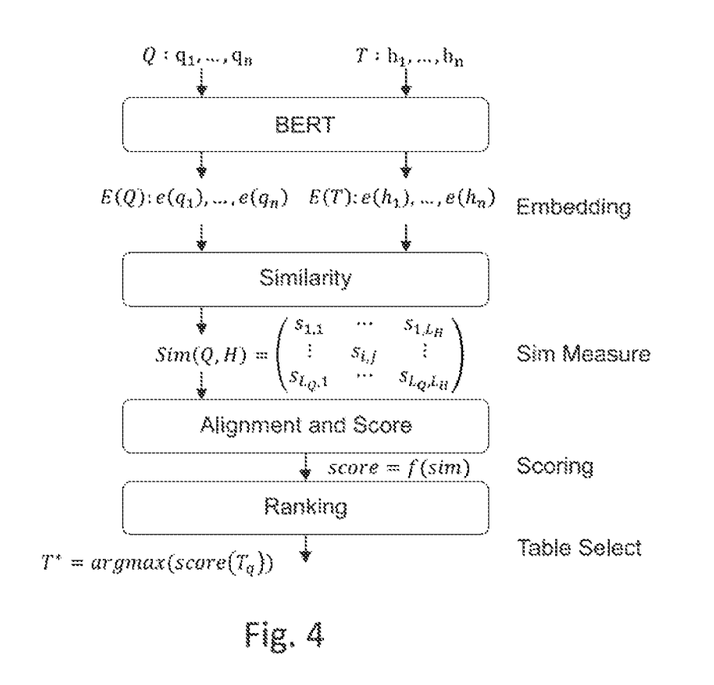
FIG. 4 shows a block diagram of a flow chart of an embodiment of a method for optimizing execution of natural language to structured query language.

Regarding the development of NL2SQL problem, one common method is using sequence-to-sequence models to generate query. They bring, however, the limited performance due to the syntax error in the generated SQL query. A sketch-based guide was later introduced to formulate the problem as predicting each value in the required slots in SELECT and WHERE clause in query. Such framework avoids the syntax error in the conventional sequence-to-sequence style SQL generation. But the FROM clause has not been addressed, though it is nearly mandatory in the product requirement. Recently, with the help of advanced language model such as BERT developed by Google since 2018, contextual word representation technology is leveraged to help models such as "SQLova" achieve human performance in certain NL2SQL tasks. In this application BERT may be used for several steps of the natural language processing. In particular, in the proof-of-principle in FIG. 4 BERT is used for several steps of the natural language processing, e. g. tokenization. Therefore, some aspects of this application refer to BERT, e. g. the proof-of-principle in FIG. 4 is shown for the usage of BERT.

There may be a need to provide an improved approach for NL2SQL to leverage the contextual word representation from a language model, which may be the key challenge to improve NL2SQL performance to generate the correct SQL query. This may be especially achieved by introducing a novel modeling solution named Semantic-Enriched SQL generator (SE-SQL). This may not only improve the performance against the state-of-the-arts, but may also offer the solution toward the product from the lab research, e. g. query syntax coverage and confidence measure. Furthermore, this may be especially achieved by an improved proposed algorithmic framework, that considers proper alignment between the input of user utterance and a database (e. g. a table schema) before feeding into the language model. Furthermore, this may be especially achieved by a new semantic enrichment component to enhance the semantic meaning of a database (e. g. a table schema) to generate a precise and complete SQL query may be introduced. Furthermore, this may be especially achieved by supporting a cross-table schema selection and an out-of-table schema rejection that is consistent with the empirical database management in real-world application.

An embodiment may provide a method for optimizing execution of natural language to structured query language, comprising the steps of receiving a natural language text input, performing natural language processing on the natural language text input to generate a plurality of encoded question tokens, performing natural language processing on a plurality of table schema stored in a database, to generate a plurality of encoded table schema tokens for each table schema of the plurality of table schema, determining a similarity between the plurality of encoded question tokens and the plurality of encoded table schema tokens for at least two table schemas of the plurality of table schema, determining an output table schema from the plurality of table schema based on the similarity and outputting a natural language string based on the output table schema. Determining the output table schema may be performed by selecting a table schema with the highest similarity from the plurality of table schema.

An Embodiment may provide a method further comprising i. executing a validation query for the output table schema to determine whether the output table schema has valid information for outputting the natural language string; and
      if the output table schema has no valid information
   ii. rejecting the output table schema;
   iii. selecting a further outputting table schema;
   iv. executing the validation query for the further output table schema; and
      if the further output table schema has no valid information
   v. repeating the steps ii.-iv.

An embodiment may provide a method further comprising statistically ranking the plurality of table schema and selecting the output table schema or the further output table schema based on the statistically ranking.

An embodiment may provide a method further comprising rejecting the output table schema if a similarity is below a threshold.

Determining the similarity may be based on a first similarity calculation of each encoded question token with all encoded table schema tokens of at least two table schemas. Determining the similarity may be based on a second similarity calculation of each encoded table schema token of at least two table schemas with all encoded question tokens. Determining the similarity may be further based on a second similarity calculation of each encoded table schema token of each the table schema with all encoded question tokens.

Generating the plurality of encoded question tokens may be performed by a first encoding layer and generating the plurality of encoded table schema tokens of each table schema may be performed by a second encoding layer. Generating the plurality of encoded table schema tokens of each table schema by the second encoding layer may be performed before receiving the natural language text input.

An embodiment may provide a method further comprising enriching at least one encoded table schema token by adding an embedded table schema synonym token and/or an embedded table schema content token to an embedded table schema token for generating the at least one enriched encoded table schema token.

An embodiment may provide a method further comprising enriching the natural language text input by text normalization and/or semantic enrichment before performing natural language processing.

An embodiment may provide a computer program comprising a computer readable storage medium having program instructions embodied therewith, the program instructions executable by a device to cause the device to receive a natural language text input and perform natural language processing on the natural language text input to generate a plurality of encoded question tokens. Further to cause the device to perform natural language processing on a plurality of table schema stored in a database, to generate a plurality of encoded table schema tokens for each table schema of the plurality of table schema, determine a similarity between the plurality of encoded question tokens and the plurality of encoded table schema tokens for at least two table schemas of the plurality of table schema and determine an output table schema from the plurality of table schema based on the similarity. Further to cause the device to output a natural language string based on the output table schema.

An embodiment may provide a system comprising a memory and at least one processor operably coupled to the memory and configured for receiving a natural language text input and performing natural language processing on the natural language text input to generate a plurality of encoded question tokens. Further configured for performing natural language processing on a plurality of table schema stored in a database, to generate a plurality of encoded table schema tokens for each table schema of the plurality of table schema, determining a similarity between the plurality of encoded question tokens and the plurality of encoded table schema tokens for at least two table schemas of the plurality of table schema and determining an output table schema from the plurality of table schema based on the similarity. Further configured for outputting a natural language string based on the output table schema.

BRIEF DESCRIPTION OF THE FIGURES

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 1:
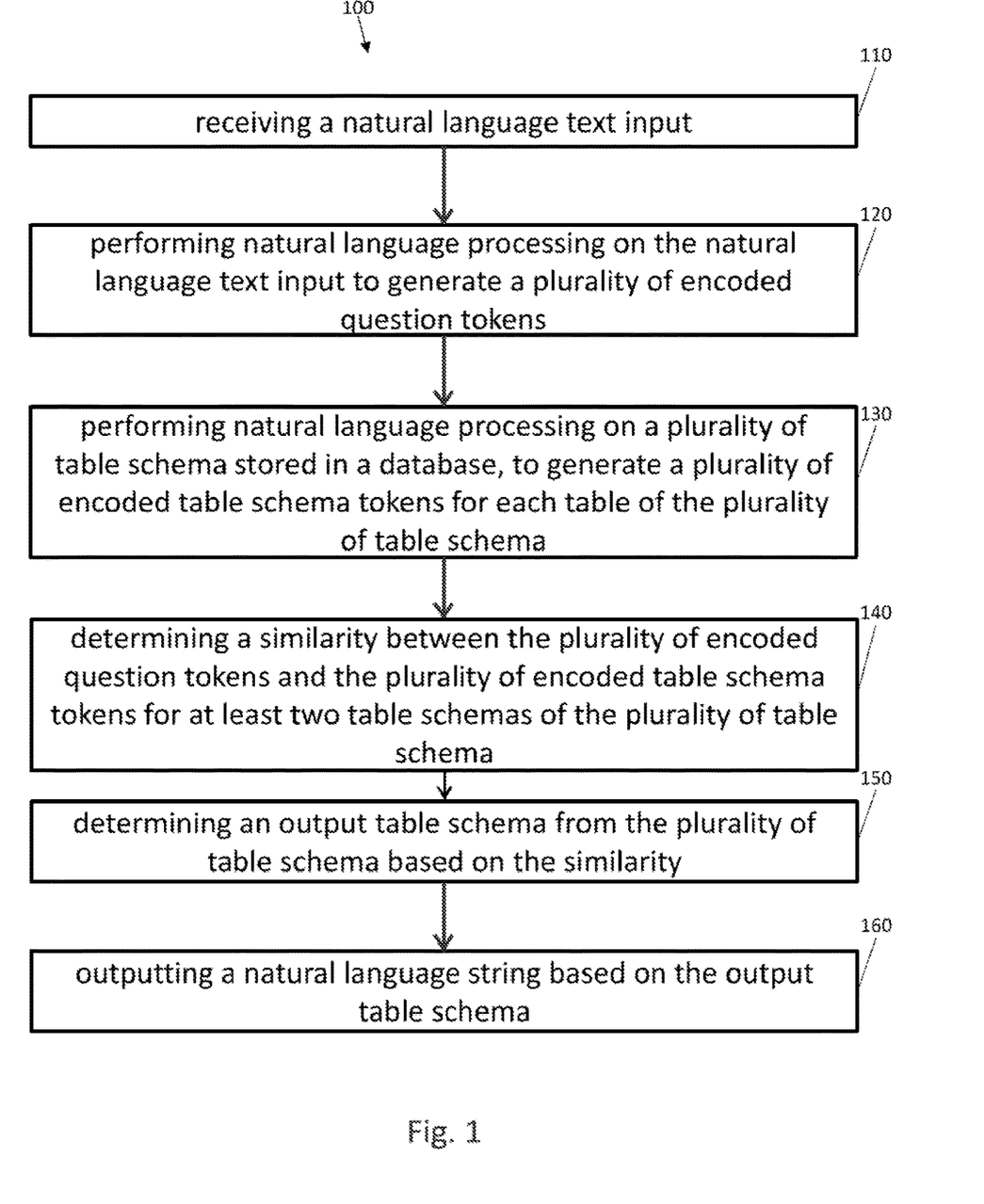
FIG. 1 shows a block diagram of a flow chart of an embodiment of a method for optimizing execution of natural language to structured query language.

FIG. 1 shows a block diagram of a flow chart of an embodiment of a method 100 for optimizing execution of natural language to structured query language. The method 100 comprises the steps of receiving 110 a natural language text input (also referred as natural language question), performing 120 natural language processing on the natural language text input to generate a plurality of encoded question tokens and performing 130 natural language processing on a plurality of table schema stored in a database, to generate a plurality of encoded table schema tokens for each table schema of the plurality of table schema. Further the method 100 comprises the steps determining 140 a similarity between the plurality of encoded question tokens and the plurality of encoded table schema tokens for at least two table schemers of the plurality of table schema and determining 150 an output table schema from the plurality of table schema based on the similarity. Furthermore, the method 100 comprises the step outputting 160 a natural language string based on the output table schema.

Receiving 110 a natural language question may be done by a transducer, e. g. a microphone. The natural language question may be a question formulated by a user and spoken into the microphone, e. g. into a microphone of a smart phone or a vehicle.

Performing 120 natural language processing on the natural language question to generate a plurality of encoded question tokens may comprise an embedding of the natural language question. In order to give a quantitative analysis of a natural language question, encoding may be applied to generate "embedding" vector for different objects. An embedding is a mapping of a discrete categorical variable to a vector of continuous numbers. It is able to compute the semantic distance or similarity between different objects such as question sentence and table schema headers. For encoding the natural language question, a pre-trained language model (e.g. BERT from Google) may be used. So, a natural language question may be firstly tokenized $$Q = \{[CLS], q_1, q_2, \ldots, q_{L_Q}, [SEP]\},$$

where $q_i$ is the ith token after applying a tokenizer (e. g. WordPiece of BERT) for the natural language question Q and $L_Q$ is the total number of question tokens. [CLS] and [SEP] are special token used by BERT to indicate the start and end index of the natural language question.

After tokenization, the tokens are fed into an encoding model (e. g. BERT) to generate each token's embedding as $$E_Q = BERT(Q) = \{E_{[CLS]}, E_{q_1}, E_{q_2}, \ldots, E_{L_Q}, E_{[SEP]}\},$$

where $E_Q$ is the generated token embeddings for the natural language question with the same length of Q.

Performing 130 natural language processing on a plurality of table schema stored in a database, to generate a plurality of encoded question tokens may comprise an embedding of the plurality of table schema. An embedding may be performed similar to performing 120 natural language processing on the natural language question. For encoding the plurality of table schema, a pre-trained language model (e.g. BERT from Google) may be used. So, each table schema of the plurality of table schema may be firstly tokenized $$H = \{[CLS], h_1, SEP, h_2, SEP, \ldots, h_{L_H}, [SEP]\},$$

where $h_i$ is the ith token after applying a tokenizer (e. g. WordPiece of BERT) for a table schema of the plurality of table schema H and $L_H$ is the total number of question tokens. For a table schema with a plurality of headers, SEP may be used to separate each header from the others.

After tokenization, the tokens are fed into an encoding model (e. g. BERT) to generate each token's embedding as $$E_H = BERT(H) = \{E_{[CLS]}, E_{h_1}, E_{[SEP]}, E_{h_2}, E_{[SEP]}, \ldots, E_{h_L}, E_{[SEP]}\},$$

where $E_H$ is the generated token embeddings for a table schema of the plurality of table schema with the same length of H.

By using a plurality of table schema, a flexible access to information stored in a database may be enabled. In comparison to a rigid API or a skillset by query language using a plurality of table schema may allow access to information stored in a database without limitation enforced by rigid API or a skillset by query language. Thus, maximize the value of information stored in the database. In principle every information stored in tabular form in a database may be used for the method 100.

In an embodiment determining 140 the similarity between the plurality of encoded question tokens and the plurality of encoded table schema tokens for at least two table schemas of the plurality of table schema may be based on a first similarity calculation of each encoded question token with all encoded table schema tokens of at least two table schemas. By the first similarity a performance of method 100 may be improved, e. g. a table schema in a backend database to which the natural language question talks to may be determined more precisely.

In principle a NL2SQL layer, which may be used after generated token embeddings, may consider the particular syntactic constrains of SQL query generation the following form:

Select clause: [(agg1, scol1), (agg2, scol2), . . . ]
From clause: [(table1), (table2), (table3)]
Where clause: [(wcol1, op1, value1), (wcol2, op1, value2), . . . ].

Here, "agg1" stands for a predicted aggregator of index 1, "scol1" stands for the predicted header of index 1 from table schema following agg1 in select clause, "wcol1" stands for the predicted header of index 1 from table schema in where clause, "op1" stands for the predicted operation of index 1 for "wcol1" in where clause, "value1" stands for the predicted value of index 1 for "wcol1" following "op1" in where clause. With such a syntax-guided sketch, objects a SQL query may be divided into six categories: namely from-table, select-column, select-aggregation, where-column, where-operator, and where-value. The similarity may be determined by the from clause as described below.

The from-table prediction may predict a table schema that have the strongest correlation to the input natural language question via confidence measure. Towards a real-world application, out-of-table schema rejection may be required to recognize which table schema in a backend database should the natural language question talks to. The first similarity calculation may improve the NL2SQL framework, so that the recognition of the table schema, to which the natural language question should talk to, may be improved. The first similarity calculation may be a nonparametric model for table schema recognition. Furthermore, the nonparametric model for table schema recognition may be used after natural language question embedding $E_Q$ (obtaining a matrix with size ($L_Q$, S) and table schema embedding $E_H$ with size (obtaining a matrix with size ($L_H$, S)).

The similarity between each natural language question token $E_{q_i}$ and all table schema tokens $E_H = \{E_{h_j}\}$ may be calculated by use of cosine distance measurement. Furthermore, a minimum pooling along the dimension j may be applied $$\text{Distance}_{i \to H} = \min_j \frac{\sum_S E_{q_i} E_{h_j}}{\sqrt{\left(\sum_S E_{q_i}^2\right)} \sqrt{\left(\sum_S E_{h_j}^2\right)}}$$

where $$\min_j$$

is the minimum pooling operation along dimension j. Further for the first similarity the average value of the similarity may be determined $$\text{Distance}_{Q \to H} = \frac{1}{L_Q} \sum_{L_Q} \text{Distance}_{i \to H}.$$

In an embodiment determining 140 the similarity may be based on a second similarity calculation of each encoded table schema token of at least two table schemas with all encoded question tokens. By the second similarity a performance of method 100 may be improved, e. g. a table schema in a backend database to which the natural language question talks to may be determined more precisely. The second similarity calculation may be a nonparametric model for table schema recognition. The second similarity between each table schema token of at least two table schemas $E_{h_j}$ with all encoded question tokens of natural language question $E_Q = \{E_{Q_i}\}$ may be calculated by use of cosine distance measurement. Furthermore, a minimum pooling along the dimension i may be applied $$\text{Distance}_{j \to Q} = \min_i \frac{\sum_S E_{q_i} E_{h_j}}{\sqrt{\left(\sum_S E_{q_i}^2\right)}\sqrt{\left(\sum_S E_{h_j}^2\right)}},$$

where $$\min_i()$$

is the minimum pooling operation along dimension i. Further for the second similarity the average value of the similarity may be determined $$\text{Distance}_{H \to Q} = \frac{1}{L_H} \sum_{L_H} \text{Distance}_{H \to Q}.$$

In an embodiment determining 140 the similarity may be further based on a second similarity calculation of each encoded table schema token of each the table schema with all encoded question tokens. So, the similarity may be given by a pairwise similarity between natural language question and table schema $$\text{Distance}_{H \leftrightarrow Q} = \frac{\text{Distance}_{Q \to H} + \text{Distance}_{H \to Q}}{2}.$$

By adding the first similarity calculation and the second similarity calculation a performance of method 100 may be improved and therefore a user experience may be improved.

In another way the sum of the first similarity and the second similarity (also referred as nonparametric model for table schema recognition) may be described by a matrix representation. The similarity for the ith word of the natural language question and the jth column of a table schema of the plurality of table schema may be described as $$s_{i,j} = s(e(q_i), e(h_j)) = \frac{e(q_i) \cdot e(h_j)}{\|e(q_i)\| \cdot \|e(h_j)\|},$$

where $w_i$ is the ith word of the natural language question and $h_j$ the jth column of a table schema and $e(q_i)$ and $e(h_j)$ are the semantic embedding, e. g. done by BERT. The similarity $S(Q, H)$ may be calculated by $$\text{Sim}(Q, H) = \begin{pmatrix} s_{1,1} & \cdots & s_{1,L_H} \\ \vdots & s_{i,j} & \vdots \\ s_{L_Q,1} & \cdots & s_{L_Q,L_H} \end{pmatrix}.$$

The value per row $r_i$ or column $c_j$ may follow to $$r_i = \min(s(:i)),$$

$$c_j = \min(s(j:)).$$

Further a normalization step may be performed leading to the first similarity r and the second similarity c $$r = \frac{\sum_{i=1}^{L_Q} r_i}{L_Q},$$

$$c = \frac{\sum_{j=1}^{L_H} c_j}{L_H}.$$

The similarity may follow than from the sum of the first similarity and the second similarity divided by two to $$\text{Sim}(Q, T) = \frac{c + r}{2}.$$

With this Similarity a performance of method 100 may be improved by combining the first similarity and the second similarity.

In an embodiment the method 100 may further comprise rejecting the output table schema if a similarity is below a threshold. For example a threshold value could be $R_{Threshold}$, so that a output table schema is rejected if the $\text{Distance}_{H \leftrightarrow Q}$ is greater or smaller than $R_{Threshold}$. So a user experience of a user using method 100 may be improved. For example, instead of giving an output based on a output table schema with low similarity, leading to a higher likelihood of outputting a non-matching natural language string to the natural language question, a message can be given that no answer can be given. So, a user experience may be improved by avoiding non-matching output.

In an embodiment determining 150 the output table schema is performed by selecting a table schema with the highest similarity from the plurality of table schema. So, an output table schema may be preferably determined with low cost of resources, e. g. computational power.

In an embodiment the method 100 may further comprise
i. executing a validation query for the output table schema to determine whether the output table schema has valid information fir outputting the natural language string; and
   if the output table schema has no valid information
ii. rejecting the output table schema;
iii. selecting a further outputting table schema;
iv. executing the validation query for the further output table schema; and
   if the further output table schema has no valid information
v. repeating the steps ii.-iv.

The validation query may be used to validate if the determined output has a valid information for answering the natural language question. For example a table schema may have the highest similarity of all table schema of the plurality of the table schemas, because the table schema may have only entries representing a word of the natural language question, so that encoded table schema tokens and encoded question tokens may have a high similarity. But the table schema may have no information to answer the natural language question, so that no matching natural language string to the natural language question can be outputted. Such an output table schema may be rejected after performing the validation query and a new output table schema may be determined. These steps may be repeated until the validation query indicates an output table schema with valid information for answering the natural language question. So, a user experience may be improved by decreasing outputting a non-matching natural language string.

Figure 5:
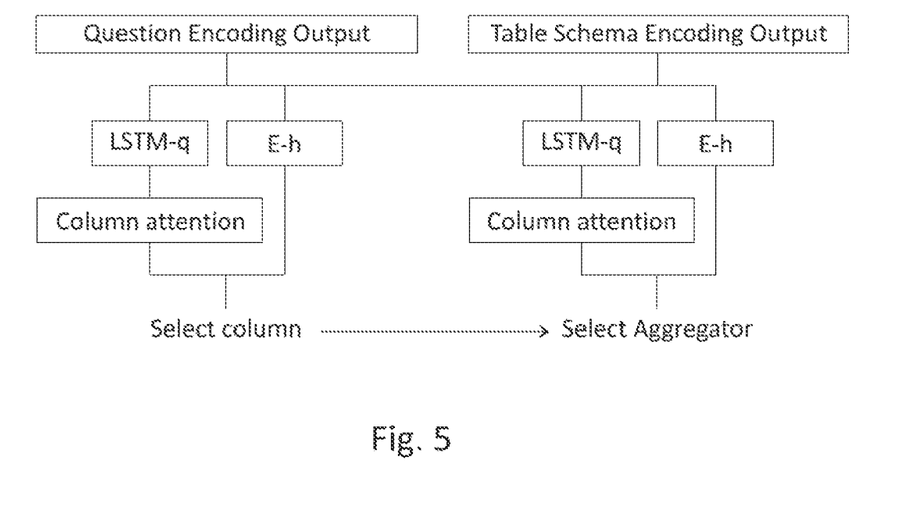
FIG. 5 shows a block diagram of a select clause.

As one task for method 100 may be to predict a header from a table schema and an aggregator tied to this header, the prediction of select clause may consists of two sub-tasks. The first sub-task may be select a column prediction and the second sub-task may be select an aggregator prediction. The natural language question may be contextualized by feeding the encoded question tokens $E_q$ to two bidirectional LSTM layer $$E_q = \text{BiLSTM}(E_q).$$

where BiLSTM is bidirectional Long-short-term-memory networks. Meanwhile, as schema header tokens are encoded separately, $E_h$ is used to denote the encoding of header h. Both $E_q$ and $E_h$ may be applied for a sub-task modeling of the two different sub-tasks. To construct the select clause, a select column prediction and a select-aggregation prediction according to FIG. 5.

The select-column prediction may predict a column from a given natural language utterance by contextualizing the natural language question of the natural language utterance through a column attention mechanism with $$s(q|h) = E_h^T \cdot W \cdot E_q,$$
$$p(q|h) = \text{softmax}(s(q|h)),$$
$$H_h = \sum_i^N p(q|h) \cdot E_q,$$
$$sc_h = W \cdot \tanh([W \cdot E_h; W \cdot H_h]),$$
$$p_h = \text{sigmoid}(sc_h),$$

where W stands for the required transformation, sigmoid( ) is sigmoid function, softmax( ) is softmax function, $H_h$ is context vector of question for given header, $sc_h$ is the column attention score, tanh is hyperbolic tangent function, [;] denotes the concatenation of two vectors, and $p_h$ indicates the probability of generating header h. The top k candidate headers may be ranked and selected to form select clause. To determine the number of k, the number to select the top k headers to achieve the maximum sum may be set to $$k = \text{argmax}\left(\sum_j p(k|h)\right),$$

where argmax( ) is an operation that finds the header that gives the maximum value from total sum of (k|h) and j is the index of header.

The select-aggregation prediction may predict an operator agg for a given header among six possible choices namely, NONE, MAX, MIN, COUNT, SUM, and AVG $$p_{agg} = W \tanh([E_q; Wsc_h]); agg = \text{argmax}(p_{agg}),$$

where $p_{agg}$ indicates the probability of generating aggregator agg, W stands for the required transformation, $E_q$ is the encoded question tokens, $sc_h$ is the column attention score, tanh is hyperbolic tangent function, [;] denotes the concatenation of two vectors, argmax( ) is an operation that finds the aggregator that gives the maximum value from $p_{agg}$.

As the task may be to predict a header from a table schema, an operation tied to such header, and an corresponding value parsed from the natural language question, a prediction of the where clause may consist of three sub-tasks: firstly a where column prediction, secondly a where operation prediction, and thirdly a where value prediction. Comparable to the select clause prediction the, the natural language question may be contextualized by feeding the encoded table schema tokens $E_q$ to two bidirectional LSTM layer.

Both $E_q$ and $E_h$ may than be applied for a sub-task modeling of the three different sub-tasks. To construct the where clause, a where column prediction, a where operation prediction and a where-value prediction according to FIG. 6.

Figure 6:
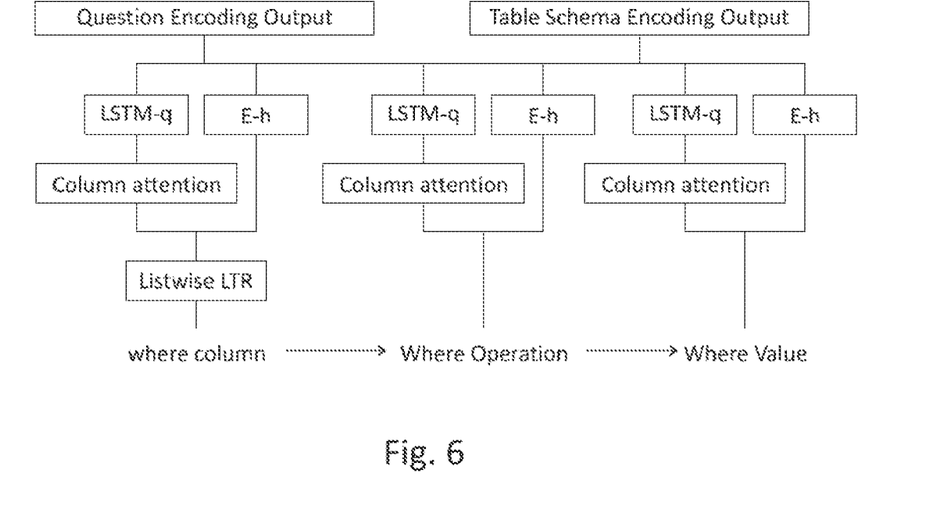
FIG. 6 shows a block diagram of a where clause.

The where-column prediction may predict a column in the where clause for a given natural language question and a header via attention and listwise Learn-To-Rank (LTR) method $$s(q|h) = E_h^T \cdot W \cdot E_q,$$
$$p(q|h) = \text{softmax}(s(q|h)),$$
$$H_h = \sum_i^N p(q|h) \cdot E_q,$$
$$sc_h = \text{maxpooling}([E_h \cdot W \cdot H_h]),$$
$$p_h = \text{sigmoid}(sc_h),$$

where W stands for the required transformation, sigmoid( ) is sigmoid function, softmax( ) is softmax function, $H_h$ is context vector of question for given header, and maxpooling( ) is the operation that samples the max value representation. Comparable to the top k header selection, the maximum sum may be achieved by setting the number to $$k = \text{argmax}(\Sigma_j p(k|h)),$$

where argmax( ) is an operation that finds the aggregator that gives the maximum value from the sum of p(k|h) along dimension j.

By introducing listwise LTR-Method into the where column (see FIG. 6) the performance of method 100 may be improved. In an embodiment the method 100 may further comprise statistically ranking the plurality of table schema and selecting the output table schema or the further output table schema based on the statistically ranking. The statistically ranking may be the listwise LTR-Method as described. By the statistically ranking a determination of an output table schema may be improved, especially if a further outputting table schema has to be determined, so that a needed computational power may be reduced.

The where-operator prediction may predict a where operator op, namely $\{=, >, <\}$, for a given header through column-attention mechanism $$p_{op} = \text{softmax}(sc_h),$$

$$op = \text{argmax}(p_{op}),$$

where $p_{op}$ is the probability of generating operator op, $sc_h$ is the calculated column-attention score, softmax( ) is the softmax function, argmax( ) is an operation that finds the operator op that gives the maximum value from $p_{op}$. The where-value prediction may predict a condition by locating start- and end-tokens from natural language question for a given header and operator $$p_{start} = \text{softmax}(WE_q sc_h V_{op})$$

$$p_{end} = \text{softmax}(WE_q sc_h V_{op})$$

where $p_{start}$ and $p_{end}$ are the probabilities of placing start and ending index at tokens to indicate the where-value location, softmax( ) is the softmax function, W stands for the required transformation, $E_q$ is the encoded question tokens, $sc_h$ is the column-attention score, $V_{op}$ is a one-hot vector of operation choice $\{=, >, <\}$. The start and end index is predicted via the predicted vector of where-column $sc_h$ and where-operation $V_{op}$.

Thus, an algorithm, which may be used as the solution for natural language interface to perform the method 100 may include a coverage support for a primary query, such as SELECT, FROM and WHERE including aggregators and operators. Further it may also include the confidence measure for quality when dealing with real life scenario, which may increase a performance.

In an embodiment of the method 100 generating the plurality of encoded question tokens is performed by a first encoding layer and generating the plurality of encoded table schema tokens of each table schema is performed by a second encoding layer. By using two different encoding layers a needed computational power may be reduced and/or a performance of method 100 may be improved by a faster performing of the method 100. In an embodiment of the method 100 generating the plurality of encoded table schema tokens of each table schema by the second encoding layer is performed before receiving the natural language text input. So, a needed computational power for performing method 100 after receiving the natural language question may be reduced.

The first encoding layer and the second encoding layer may be a language model (e. g. BERT), which may introduce contextual word representation. So, the natural language question may be encoded without further steps and/or contextual information. In a in real-world application, as the question part may be fed into the encoder after receiving the natural language question, the encoding may be only be performed after the receiving. With the second encoding layer, the plurality of table schema may be encoded before receiving the natural language question. So, the question-schema encoding may be separated from the natural language question encoding into individual steps. Therefore, an inference time needed for performing the method 100 may be greatly reduced. By separating into two encoding layers, there may be only the natural language question to be encoded per request, while available table schema of the plurality of table schema may be encoded before. So, a complexity in comparison to a combined encoding of natural language question and the plurality of table schema as many as may be beneficial reduced.

In an embodiment the method 100 may comprise enriching at least one encoded table schema token by adding an embedded table schema synonym token and/or an embedded table schema content token to an embedded table schema token for generating the at least one enriched encoded table schema token. One key challenge in NL2SQL models may be to precisely parsing header(s) from table schema based on a natural language question. A user may ask a natural language question in a flexible way. So, there may be a need to introduce a different word and/or a representation to indicate the target header. To avoid a potential mismatch between a user utterance and a table schema value in term of one objective, a semantic enrichment for a table schema may be done. Thus, a mismatch condition between a natural language question and the determined output table schema may be reduced and/or avoided.

The semantic enrichment may be performed by two steps. The first step may be using a table schema synonym token and the second step may be using an embedded table schema content token. Firstly, each header may have a number of in "alias" by adding its synonyms to supplement the semantic representation. Secondly, at most a number of n table schema contents may be chosen to produce feature vectors, which may have the same length to the table schema header $$E_{H_{SE}} = E_H + E_{H_{synonym}} + E_{H_{content}},$$

where $E_H$ is the embeddings from the raw headers input, $E_{H_{synonym}}$ is the embeddings from the raw headers' synonyms input (also table schema synonym token), and $E_{H_{content}}$ is the embeddings from the selected table schema content input (also embedded table schema content token). Therefore, the overall semantic enriched schema embedding may be a (L,S)-size matrix. Alternatively, the semantic enrichment may be done only by one of the two steps. For example, only by enrichment with a schema synonym token or with an embedded table schema content token. For example, a table schema column may comprise the word "Gender". This word may be semantic enriched by its semantics by adding "sex", and/or by selective content, such as "male" and/or "female". Each word may then be embedded by natural language processing, e. g. by BERT, and finally a sum up of all those embedded words may be used as the semantic enriched encoding for this table schema column.

As the proposed table schema encoding may be independent of the question encoding by using the two different encoding layers, the semantic enrichment may be performed as a preprocessing effort before receiving the natural language question. Thus, a needed computational power is not influenced and the performance of method 100 may be improved. Furthermore, a user may get a better experience by an improved algorithm performance, because of enriched semantics by semantic enrichment of a table schema.

In an embodiment the method 100 may further comprise enriching the natural language text input by text normalization and/or semantic enrichment before performing natural language processing.

A user may ask a natural language question in a flexible way. So, there may be a need to introduce a different word, a text normalization and/or a representation to indicate the target of the natural language question. For example, a user may ask about an information of the "last week". So, there may be a need for text normalization of "last week" to a period defined by a date specification. Thus, a user may get a better experience by an improved algorithm performance, because of enriched semantics by semantic enrichment of a natural language question.

Figure 2:
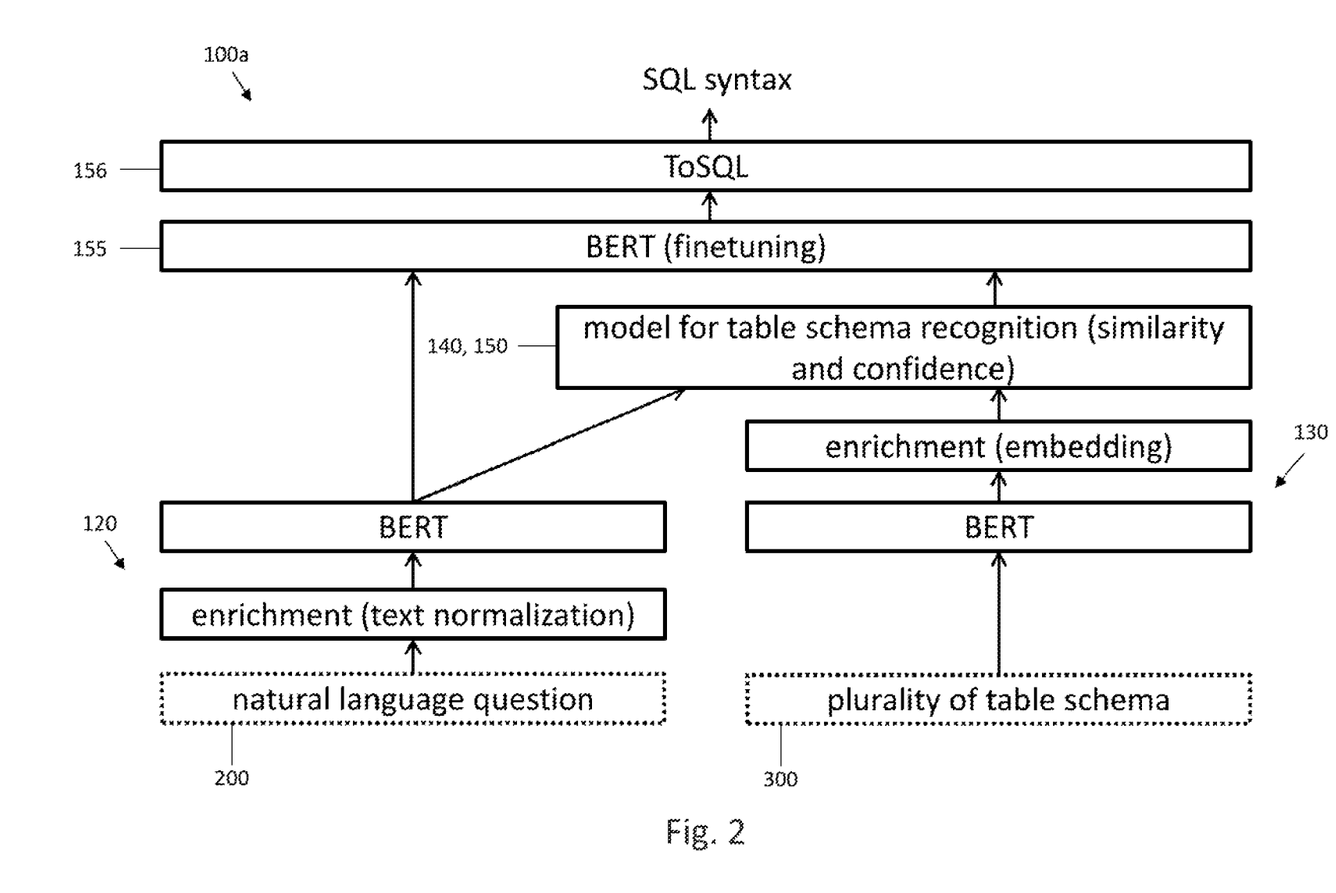
FIG. 2 shows a block diagram of a flow chart of an embodiment of a method for optimizing execution of natural language to structured query language.
Figure 3:
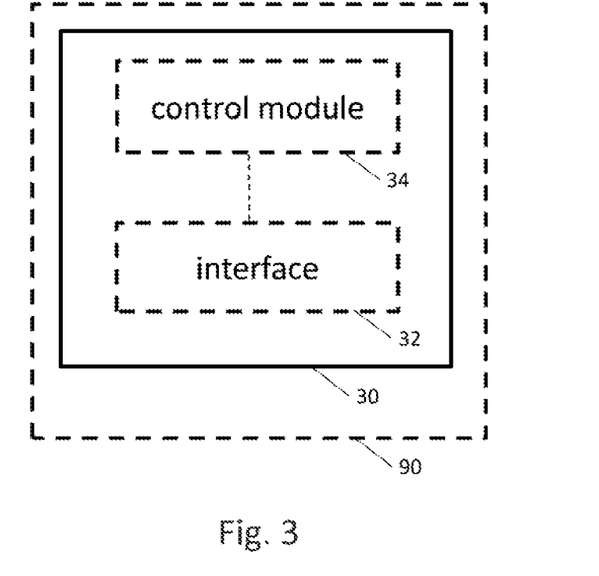
FIG. 3 shows a block diagram of an embodiment of a device.

More details and aspects are mentioned in connection with the embodiments described above or below. The example shown in FIG. 1 may comprise one or more optional additional features corresponding to one or more aspects mentioned in connection with the proposed concept or one or more examples described below (e. g. FIG. 2-3).

FIG. 2 shows a block diagram of a flow chart of an embodiment of a method for optimizing execution of natural language to structured query language. The method 100a comprises the steps, performing 120 natural language processing on the natural language text input to generate a plurality of encoded question tokens and performing 130 natural language processing on a plurality of table schema stored in a database, to generate a plurality of encoded table schema tokens for each table schema of the plurality of table schema. The step performing 120 may comprise a tokenization, an encoding by a language model-based encoder and a token embedding and may be performed by the first encoding layer. For this BERT may be used. Additionally, or alternatively, a semantic enrichment of the natural language question, performed by text normalization, may be performed before applying BERT. The step performing 130 may comprise a tokenization, an encoding by a language model-based encoder, a semantic enrichment and a token embedding and may be performed by the second encoding layer. Performing 130 may be done as a first preprocess, before a natural language question is received. The first encoding layer and the second encoding layer may be identical or different. Furthermore, the performing 120 may be done as a second preprocess before the BERT 155 finetuning is done.

Further the method 100a comprises the steps determining 140 a similarity between the plurality of encoded question tokens and the plurality of encoded table schema tokens for at least two table schemas of the plurality of table schema and determining 150 an output table schema from the plurality of table schema based on the similarity. The determining 140 may performed by a model for table recognition as described above, e. g. the sum of the first similarity and the second similarity and/or by confidence measurements. Additionally, or alternatively, the model for table schema recognition may also determine the output table schema. The model for table schema recognition may also be performed during the second preprocess before the BERT finetuning may be done.

After determining the output table schema BERT 155 may be used for a fine tuning and after this step a ToSQL 156 may be used to generate a SQL syntax. Both steps may be performed online. The generated SQL syntax may be decoded by a neural network-based decoder leading to an outputting of a natural language string based on the output table schema.

Further to perform the method 100a input parameters, namely the natural language question 200 and the plurality of table schemas 300, may be needed. The natural language question 200 may be collected across utterances of user(s) and the plurality of table schema 300 may be collected from a backend database. The method 100 may process such two type of data into a SQL query. This may be organized by a context-aware question encoding layer 120 for the natural language question 200 and a semantic-enriched table schema encoding layer 130 for the plurality of table schema 300. Further, an out-of-table prediction layer 140, 150 (the nonparametric model for table schema recognition) and a NL2SQL decoding layer (neural network-based decoder), which may be included into the step ToSQL 156. Optionally a SQL execution layer may be used for outputting the natural language string.

More details and aspects are mentioned in connection with the embodiments described above or below. The example shown in FIG. 2 may comprise one or more optional additional features corresponding to one or more aspects mentioned in connection with the proposed concept or one or more examples described above (e. g. FIG. 1) or below (e. g. FIG. 3).

FIG. 3 shows a block diagram of an embodiment of a device. The device 30 comprises processing circuitry, which is configured to perform the method described herein. For example, the device 30 may comprise one or more interfaces 32, which are coupled to a control module 34. The device 30 may be used in a vehicle 90, The control module 34 controls the one or more interfaces 32 and is configured to perform any of the methods described herein. Another embodiment is a machine-readable medium including code, when executed, to cause a machine to perform the method for training a machine learning module for determining a route connecting a plurality of destinations in a road network.

In embodiments the one or more interfaces 32 may correspond to any means for obtaining, receiving, transmitting or providing analog or digital signals or information, e.g. any connector, contact, pin, register, input port, output port, conductor, lane, etc. which allows providing or obtaining a signal or information. An interface 32 may be configured to communicate, i.e. transmit or receive signals, information with further internal or external components. The one or more interfaces 32 may comprise further components to enable according communication in a (mobile) communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. In some examples the one or more interfaces 32 may serve the purpose of transmitting or receiving or both, transmitting and receiving, information, such as information, input data, control information, further information messages, etc.

As shown in FIG. 3 the respective one or more interfaces 32 are coupled to the respective control module 34 at the apparatus 30. In embodiments the control module 34 may be implemented using one or more processing units, one or more processing devices, any means for processing, such as a processor, a computer or a programmable hardware component being operable with accordingly adapted software. In other words, the described functions of the control module 34 may as well be implemented in software, which is then executed on one or more programmable hardware components. Such hardware components may comprise a general-purpose processor, a Digital Signal Processor (DSP), a micro-controller, etc.

In an embodiment the device 30 may be a system comprising a memory and at least one processor 34 operably coupled to the memory and configured for:
   a. receiving a natural language text input;
   b. performing natural language processing on the natural language text input to generate a plurality of encoded question tokens;
   c. performing natural language processing on a plurality of table schema stored in a database, to generate a plurality of encoded table schema tokens for each table schema of the plurality of table schema;

d. determining a similarity between the plurality of encoded question tokens and the plurality of encoded table schema tokens for at least two table schemas of the plurality of table schema;

e. determining an output table schema from the plurality of table schema based on the similarity; and f. outputting a natural language string based on the output table schema.

More details and aspects are mentioned in connection with the embodiments described above or below. The example shown in FIG. 3 may comprise one or more optional additional features corresponding to one or more aspects mentioned in connection with the proposed concept or one or more examples described above (e. g. FIG. 1-2).

To prove the performance of the method herein above a test case was used. The deployment of the method described herein was tested on a trip pattern prediction task, that predicts which location a user will visit at certain time for a given trip history. The method used for the test case is shown in FIG. 4.

The dataset for the test case comprises:
WikiSQL: https://github.com/salesforce/WikiSQL. Introduced by Salesforce, the most popular benchmark dataset for NL2SQL evaluation.
Contains a corpus of 80 k instances of natural language questions, SQL queries, and tables extracted from over 25 k HTML tables from Wikipedia.
From clause prediction: As WikiSQL constrains the NL2SQL to be one-question-to-one-table scenario, a customized dataset for table recognition was used. For each question sample, 10 other table schemas were collected to be the negative samples along with the origin paired one to consist 11 candidates under evaluation.

The metrics for the test case comprises:
Regarding from clause prediction, reporting the confidence measurement toward out-of-table rejection: Rejection rate
Regarding NL2SQL of WikiSQL data evaluation, two widely-used metrics under NLI scope were applied:
Logical-form accuracy (LF): exact query-string match.
Execution accuracy (EX): the query-executed result match.

The dataset was chosen with 1 positive and 10 negative table schema: 11, per case; totally 56300 cases. For the algorithm was assumed 10-token question and 6-column table schema, so leading to a 10×6 similarity matrix for determination of similarity for each pair of a question and a table schema. The matrix will be applied alignment and score measurement to generate the similarity. If the score is lower than $R_{threshold}$ the prediction was accepted and then NL2SQL prediction was conducted on top of the natural language question encoding and the accepted output table schema. Otherwise the output table schema was rejected.

The results for the table classification are:
Evaluation metrics of top 3 accuracy of table classification
Top 1 Top 2 Top 3
85% 93% 96%
Confidence Measurement
Set $R_{threshold}$ value as 1.1 to do out-of-table rejection.
Rejection rate: 9% (FN=66% among rejected case)
Accuracy among 91% accepted cases: 87%
False Positive: 45% among rejection cases
Summary:
When having positive case available, total accuracy exceeds 85%
When having rejection enabled, it can reject 55% wrong cases success, and reject 6% correct cases.
Among accepted cases, the accuracy is improved from original 85% to 87%.
Threshold offers the opportunity to adjust the performance.

The results for the query classification are:
The task is SQL generation to form select clause and where clause for WikiSQL task. The dataset is WikiSQL and was divided into three different datasets: train (55 k), dev (8 k), and test set (16 k).

The Baseline Model is SQLova (https://arxiv.org/abs/1902.01069), The logical form (LF) and the execution accuracy (EX) on WikiSQL dataset of baseline model and the proposed model are reported. SE-SQL outperforms the selected baseline SQLova by a promising margin, achieving +1.7 LF and +1.1 EX for dev set and +1.8 LF and +1.8 EX for test set in WikiSQL data.

| Overall performance of WikiSQL task | | |
| --- | --- | --- |
| Model | LF | EX |
| WikiSQL dev set | | |
| SQLova(baseline) | 81.6 | 87.2 |
| SE-SQL(ours) | 83.3 | 88.3 |
| Improvement | 1.7 | 1.1 |
| WikiSQL test set | | |
| SQLova(baseline) | 80.7 | 86.2 |
| SE-SQK(ours) | 82.5 | 88.0 |
| Improvement | 1.8 | 1.8 |
| Breakdown result of Logical Form accuracy | | |
| Sub-modular | Dev | Test |
| select-column | 98.5 | 98.3 |
| select-aggregator | 91.5 | 91.1 |
| where-column | 94.9 | 95.1 |
| where-operator | 98.0 | 97.9 |
| where-value | 97.0 | 97.1 |

The result indicates that the proposed framework and model shows a promising potential of being a NL2SQL solution.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A computer-implemented method for optimizing execution of natural language to structured query language, comprising the steps of:
    a. receiving a natural language text input;
    b. performing natural language processing on the natural language text input;
    c. generating a plurality of encoded question tokens;
    d. performing natural language processing on a plurality of table schema stored in a database;
    e. generating a plurality of encoded table schema tokens for each processed table schema of the plurality of table schema;
    f. determining a similarity between the plurality of encoded question tokens and the plurality of encoded table schema tokens for at least two table schemas of the plurality of table schema;
    g. determining an output table schema from the plurality of table schema based on the similarity,
        wherein determining the output table schema comprises:
            selecting a table schema with the highest similarity from the plurality of table schema, and
            rejecting the output table schema if a similarity is below a threshold;
    h. executing a validation query for the output table schema to determine whether the output table schema has valid information for outputting the natural language string, and, when the output table schema has no valid information:
        1. Rejecting the output table schema,
        2. selecting a further outputting table schema,
        3. Executing the validation query for the further output table schema, and
        4. repeating the steps 1.-3. when the further output table schema has no valid information; and
    i. outputting a natural language string based on the output table schema.

2. A method according to claim 1, whereby
determining the similarity is based on a first similarity calculation of each encoded question token with all encoded table schema tokens of at least two table schemas.

3. A method according to claim 2, whereby
determining the similarity is further based on a second similarity calculation of each encoded table schema token of each the table schema with all encoded question tokens.

4. A method according to claim 1, whereby
determining the similarity is based on a second similarity calculation of each encoded table schema token of at least two table schemas with all encoded question tokens.

5. A method according to claim 1, further comprising
statistically ranking the plurality of table schema; and
selecting the output table schema or the further output table schema based on the statistically ranking.

6. A method according to claim 1, whereby
generating the plurality of encoded question tokens is performed by a first encoding layer; and
generating the plurality of encoded table schema tokens of each table schema is performed by a second encoding layer.

7. A method according to claim 6, whereby
generating the plurality of encoded table schema tokens of each table schema by the second encoding layer is performed before receiving the natural language text input.

8. A method according to claim 1, further comprising
enriching at least one encoded table schema token by adding an embedded table schema synonym token and/or an embedded table schema content token to an embedded table schema token for generating the at least one enriched encoded table schema token.

9. A method according to claim 1, further comprising
enriching the natural language text input by text normalization and/or semantic enrichment before performing natural language processing.

10. A computer program product comprising a non-transitory, computer-readable storage medium having program instructions embodied therewith, the program instructions executable by a device to cause the device to:
    a. receive a natural language text input;
    b. perform natural language processing on the natural language text input;
    c. generate a plurality of encoded question tokens;
    d. perform natural language processing on a plurality of table schema stored in a database;
    e. generate a plurality of encoded table schema tokens for each processed table schema of the plurality of table schema;

f. determine a similarity between the plurality of encoded question tokens and the plurality of encoded table schema tokens for at least two table schemas of the plurality of table schema;
g. determine an output table schema from the plurality of table schema based on the similarity,
   wherein determining the output table schema comprises:
      selecting a table schema with the highest similarity from the plurality of table schema, and
      rejecting the output table schema if a similarity is below a threshold;
h. execute a validation query for the output table schema to determine whether the output table schema has valid information for outputting the natural language string, and, when the output table schema has no valid information:
   1. Rejecting the output table schema,
   2. Selecting a further outputting table schema,
   3. Executing the validation query for the further output table schema, and
   4. repeating the steps 1.-3. when the further output table schema has no valid information; and
i. output a natural language string based on the output table schema.

11. A system comprising:
a memory, and
at least one processor operably coupled to the memory and configured for:
   a. receiving a natural language text input;
   b. performing natural language processing on the natural language text input;
   c. generating a plurality of encoded question tokens;
   d. performing natural language processing on a plurality of table schema stored in a database;
   e. generating a plurality of encoded table schema tokens for each processed table schema of the plurality of table schema;
   f. determining a similarity between the plurality of encoded question tokens and the plurality of encoded table schema tokens for at least two table schemas of the plurality of table schema;
   g. determining an output table schema from the plurality of table schema based on the similarity,
      wherein determining the output table schema comprises:
         selecting a table schema with the highest similarity from the plurality of table schema, and
         rejecting the output table schema if a similarity is below a threshold;
   h. executing a validation query for the output table schema to determine whether the output table schema has valid information for outputting the natural language string, and, when the output table schema has no valid information:
   1. Rejecting the output table schema,
   2. Selecting a further outputting table schema,
   3. Executing the validation query for the further output table schema, and
   4. repeating the steps 1.-3. when the further output table schema has no valid information; and
   i. outputting a natural language string based on the output table schema.

* * * * *